(12) United States Patent
Sun et al.

(10) Patent No.: US 11,378,778 B2
(45) Date of Patent: Jul. 5, 2022

(54) CAMERA OPTICAL LENS

(71) Applicant: AAC Optics Solutions Pte. Ltd., Singapore (SG)

(72) Inventors: Wen Sun, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 370 days.

(21) Appl. No.: 16/681,858

(22) Filed: Nov. 13, 2019

(65) Prior Publication Data

US 2020/0409054 A1   Dec. 31, 2020

(30) Foreign Application Priority Data

Jun. 30, 2019   (CN) .......................... 201910582036.8

(51) Int. Cl.
*G02B 9/62* (2006.01)
*G02B 13/00* (2006.01)
*G02B 27/00* (2006.01)

(52) U.S. Cl.
CPC ........... *G02B 9/62* (2013.01); *G02B 13/0045* (2013.01); *G02B 27/0012* (2013.01)

(58) Field of Classification Search
CPC .... G02B 13/06; G02B 13/18; G02B 13/0045; G02B 3/04; G02B 27/0012; B02B 9/62; B02B 9/64; H04N 5/2254
USPC ................................ 359/713, 756, 757, 759
See application file for complete search history.

(56) References Cited

U.S. PATENT DOCUMENTS

2014/0063616 A1*   3/2014   Okano ..................... G02B 3/04
                                                                        359/713

* cited by examiner

*Primary Examiner* — Travis S Fissel
(74) *Attorney, Agent, or Firm* — W&G Law Group

(57) ABSTRACT

The present invention discloses a camera optical lens. The camera optical lens includes, in an order from an object side to an image side, a first lens, a second lens, a third lens, a fourth lens, a fifth lens, and a sixth lens. The second lens has a negative refractive power, and the third lens has a positive refractive power. The camera optical lens further satisfies the specific conditions: $0.80 \leq f1/f \leq 5.00$ and $-11.00 \leq R5/d5 \leq -8.00$. The camera optical lens can achieve a high performance while obtaining a low TTL.

20 Claims, 7 Drawing Sheets

CAMERA OPTICAL LENS

FIELD OF THE PRESENT DISCLOSURE

The present disclosure relates to the field of optical lens, more particularly, to a camera optical lens suitable for handheld terminal devices, such as smart phones and digital cameras, and imaging devices such as monitors or PC lenses.

DESCRIPTION OF RELATED ART

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent need for ultra-thin, wide-angle camera lenses with good optical characteristics and fully corrected chromatic aberration.

DETAILED DESCRIPTION OF THE EXEMPLARY EMBODIMENTS

In order to make the objects, technical solutions, and advantages of the present invention more apparent, the embodiments of the present invention will be described in detail below, combined with the drawings. However, it will be apparent to the one skilled in the art that, in the various embodiments of the present invention, a number of technical details are presented in order to provide the reader with a better understanding of the invention. However, the technical solutions claimed in the present invention can be implemented without these technical details and can be implemented based on various changes and modifications to the following embodiments.

Embodiment 1

Figure 1:
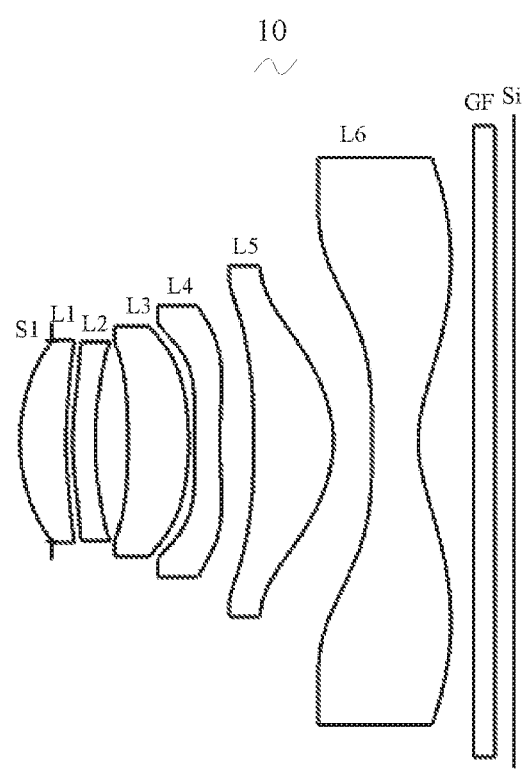
FIG. 1 is a schematic diagram of a structure of a camera optical lens in accordance with Embodiment 1 of the present disclosure.

As referring to a figure, the present invention provides a camera optical lens 10. FIG. 1 shows the camera optical lens 10 according to embodiment 1 of the present invention, the camera optical lens 10 comprises six lenses. Specifically, from an object side to an image side, the camera optical lens 10 comprises in sequence: an aperture S1, a first lens L1, a second lens L2, a third lens L3, a fourth lens L4, a fifth lens L5, and a sixth lens L6. Optical elements like optical filter GF can be arranged between the sixth lens L6 and an image surface Si.

The first lens L1 is made of plastic material, the second lens L2 is made of plastic material, the third lens L3 is made of plastic material, the fourth lens L4 is made of plastic material, the fifth lens L5 is made of plastic material, and the sixth lens L6 is made of plastic material.

The second lens L2 has a negative refractive power, and the third lens L3 has a positive refractive power.

Here, a focal length of the whole optical camera lens 10 is defined as f, and a focal length of the first lens L1 is defined as f1. The camera optical lens 10 satisfies the following condition: $0.80 \leq f1/f \leq 5.00$, which specifies the positive refractive power of the first lens L1. If the value of f1/f exceeds the lower limit of the above condition, although it is beneficial for developing toward ultra-thin lenses, the positive refractive power of the first lens L1 would be too strong to correct an aberration of the camera optical lens, and it is bad for wide-angle development of lens. On the contrary, if the value of f1/f exceeds the upper limit of the above condition, the positive refractive power of the first lens L1 becomes too weak to develop ultra-thin lenses. Preferably, the following condition shall be satisfied, $0.84 \leq f1/f \leq 4.91$.

A curvature radius of an object side surface of the third lens L3 is defined as R5, and an on-axis thickness of the third lens L3 is defined as d5. The camera optical lens 10 satisfies the following condition: $-11.00 \leq R5/d5 \leq -8.00$. It is beneficial for correcting an aberration of the camera optical lens by controlling the refractive power within a reasonable range. Preferably, the following condition shall be satisfied, $-10.84 \leq R5/d5 \leq -8.06$.

A total optical length from an object side surface of the first lens L1 to the image surface Si of the camera optical lens 10 along an optical axis is defined as TTL. When the focal length of the camera optical lens of the present invention, the focal length of the first lens, the curvature radius of the third lens and the on-axis thickness of the third lens satisfy the above conditions, the camera optical lens has the advantage of high performance and meets the design requirement on low TTL.

In the embodiment, the object side surface of the first lens L1 is convex in a paraxial region, and the first lens L1 has a positive refractive power.

A curvature radius of the object side surface of the first lens L1 is defined as R1, a curvature radius of an image side surface of the first lens L1 is defined as R2, and the camera optical lens 10 satisfies the following condition: $-37.66 \leq (R1+R2)/(R1-R2) \leq -0.61$, and this reasonably controls a shape of the first lens, so that the first lens can effectively correct a spherical aberration of the system. Preferably, the following condition shall be satisfied, $-23.54 \leq (R1+R2)/(R1-R2) \leq -0.77$.

An on-axis thickness of the first lens L1 is defined as d1. The camera optical lens 10 satisfies the following condition: $0.04 \leq d1/TTL \leq 0.15$, which is beneficial for developing ultra-thin lenses. Preferably, the following condition shall be satisfied, $0.06 \leq d1/TTL \leq 0.12$.

In the embodiment, an object side surface of the second lens L2 is convex in the paraxial region, and an image side surface is concave in the paraxial region.

The focal length of the camera optical lens 10 is defined as f, and a focal length of the second lens L2 is defined as f2. The camera optical lens satisfies the following condition: $-109.93 \leq f2/f \leq -1.63$, which is beneficial for correcting the aberration of the camera optical lens by controlling the negative refractive power of the second lens L2 being within a reasonable range. Preferably, the following condition shall be satisfied, $-68.70 \leq f2/f \leq -2.04$.

A curvature radius of the object side surface of the second lens L2 is defined as R3, and a curvature radius of the image side surface of the second lens L2 is defined as R4. The camera optical lens 10 satisfies the following condition: $0.64 \leq (R3+R4)/(R3-R4) \leq 49.33$, which specifies A shape of the second lens L2. When the value is within the range, as the camera optical lens develops toward ultra-thin and wide-angle, it is beneficial for correcting the problem of an axial chromatic aberration. Preferably, the following condition shall be satisfied, $1.03 \leq (R3+R4)/(R3-R4) \leq 39.46$.

An on-axis thickness of the second lens L2 is defined as d3. The camera optical lens 10 satisfies the following condition: $0.02 \leq d3/TTL \leq 0.08$, which is beneficial for developing ultra-thin lenses. Preferably, the following condition shall be satisfied, $0.04 \leq d3/TTL \leq 0.06$.

In the embodiment, an object side surface of the third lens L3 is concave in the paraxial region, and an image side surface of the third lens L3 is convex in the paraxial region.

The focal length of the camera optical lens 10 is defined as f, and a focal length of the third lens L3 is defined as f3. The camera optical lens 10 satisfies the following condition: $0.37 \leq f3/f \leq 4.47$. The refractive power is reasonably distributed so that the camera optical lens has a good imaging quality and lower sensitivity. Preferably, the following condition shall be satisfied, $0.59 \leq f3/f \leq 3.57$.

A curvature radius of the object side surface of the third lens L3 is defined as R5, and a curvature radius of an image side surface of the third lens L3 is defined as R6. The camera optical lens 10 satisfies the following condition: $0.85 \leq (R5+R6)/(R5-R6) \leq 5.99$, which can effectively control a shape of the third lens L3. It is beneficial for shaping of the third lens L3, and the bad shaping and stress generation due to extra large surface curvature of the third lens L3 can be avoided. Preferably, the following condition shall be satisfied, $1.36 \leq (R5+R6)/(R5-R6) \leq 4.79$.

An on-axis thickness of the third lens L3 is defined as d5. The camera optical lens 10 satisfies the following condition: $0.04 \leq d5/TTL \leq 0.18$, which is beneficial for developing ultra-thin lenses. Preferably, the following condition shall be satisfied, $0.07 \leq d5/TTL \leq 0.15$.

In the embodiment, an object side surface of the fourth lens L4 is convex in the paraxial region, an image side surface is concave in the paraxial region, and the fourth lens L4 has a negative refractive power.

The focal length of the camera optical lens 10 is defined as f, a focal length of the fourth lens L4 is defined as f4. The camera optical lens 10 satisfies the following condition: $-4.42 \leq f4/f \leq -0.95$. The refractive power is reasonably distributed so that the camera optical lens has a good imaging quality and lower sensitivity. Preferably, the following condition shall be satisfied, $-2.76 \leq f4/f \leq -1.19$.

A curvature radius of the object side surface of the fourth lens L4 is defined as R7, and a curvature radius of the image side surface of the fourth lens L4 is defined as R8. The camera optical lens 10 satisfies the following condition: $0.87 \leq (R7+R8)/(R7-R8) \leq 3.74$, which specifies a shape of the fourth lens L4. When the value is within the range, as the camera optical lens develops toward ultra-thin and wide-angle, it is beneficial for correcting the problem of an off-axis abberation. Preferably, the following condition shall be satisfied, $1.39 \leq (R7+R8)/(R7-R8) \leq 2.99$.

An on-axis thickness of the fourth lens L4 is defined as d7. The camera optical lens 10 satisfies the following condition: $0.03 \leq d7/TTL \leq 0.09$, which is beneficial for developing ultra-thin lenses. Preferably, the following condition shall be satisfied, $0.04 \leq d7/TTL \leq 0.07$.

In the embodiment, an object side surface of the fifth lens L5 is concave in the paraxial region, an image side surface of the fifth lens L5 is convex in the paraxial region, and the fifth lens L5 has a positive refractive power.

The focal length of the camera optical lens 10 is defined as f, and a focal length of the fifth lens L5 is defined as f5. The camera optical lens 10 satisfies the following condition: $0.33 \leq f5/f \leq 3.08$, which can effectively make a light angle of the camera lens be gentle, and reduce the tolerance sensitivity. Preferably, the following condition shall be satisfied, $0.52 \leq f5/f \leq 2.47$.

A curvature radius of the object side surface of the fifth lens L5 is defined as R9, and a curvature radius of the image side surface of the fifth lens L5 is defined as R10. The camera optical lens 10 satisfies the following condition: $0.61 \leq (R9+R10)/(R9-R10) \leq 9.92$, which specifies a shape of the fifth lens L5. When the value is within the range, as the camera optical lens develops toward ultra-thin and wide-angle, it is beneficial for correcting the problem of off-axis abberation. Preferably, the following condition shall be satisfied, $0.98 \leq (R9+R10)/(R9-R10) \leq 7.93$.

An on-axis thickness of the fifth lens L5 is defined as d9. The camera optical lens 10 satisfies the following condition: $0.05 \leq d9/TTL \leq 0.30$, which is beneficial for developing ultra-thin lenses. Preferably, the following condition shall be satisfied, $0.08 \leq d9/TTL \leq 0.24$.

In the embodiment, an image side surface of the sixth lens L6 is concave in the paraxial region, and the sixth lens L6 has a negative refractive power.

The focal length of the camera optical lens 10 is defined as f, and a focal length of the sixth lens L6 is defined as f6. The camera optical lens 10 satisfies the following condition: $-5.18 \leq f6/f \leq -0.41$. The refractive power is reasonably distributed so that the system has a good imaging quality and lower sensitivity. Preferably, the following condition shall be satisfied, $-3.24 \leq f6/f \leq -0.51$.

A curvature radius of an object side surface of the sixth lens L6 is defined as R11, and a curvature radius of the image side surface of the sixth lens L6 is defined as R12. The camera optical lens 10 satisfies the following condition: 0.47≤(R11−R12)/(R11−R12)≤9.51, which specifies the shape of the sixth lens L6. When the value is within the range, as the camera optical lens develops toward ultra-thin and wide-angle, it is beneficial for correcting the problem of the off-axis abberation. Preferably, the following condition shall be satisfied, 0.75≤(R11+R12)/(R11−R12)≤7.61.

An on-axis thickness of the sixth lens L6 is defined as d11. The camera optical lens 10 satisfies the following condition: 0.04≤d11/TTL≤0.15, which is beneficial for developing ultra-thin lenses. Preferably, the following condition shall be satisfied, 0.06≤d11/TTL≤0.12.

In this embodiment, the focal length of camera optical lens 10 is defined as f, a combined focal length of the first lens L1 and the second lens L2 is defined as f12, and the camera optical lens 10 satisfies the following condition: 0.62≤f12/f≤7.33. With such configuration, the aberration and distortion of the camera optical lens can be eliminated while suppressing a back focal length of the camera optical lens, thereby maintaining miniaturization of the camera lens system. Preferably, the following condition shall be satisfied, 0.99≤f12/f≤5.87.

In this embodiment, the total optical length TTL of the camera optical lens 10 is less than or equal to 5.50 mm, and it is beneficial for developing ultra-thin lenses. Preferably, the total optical length TTL of the camera optical lens 10 is less than or equal to 5.25 mm.

In this embodiment, an F number of the camera optical lens 10 is less than or equal to 1.90. The camera optical lens 10 has a large F number and a better imaging performance. Preferably, the F number of the camera optical lens 10 is less than or equal to 1.86.

With such design, the total optical length TTL of the camera optical lens 10 can be made as short as possible, thus the miniaturization characteristics can be maintained.

In the following, examples will be used to describe the camera optical lens 10 of the present invention. The symbols recorded in each example will be described as follows. The focal length, on-axis distance, curvature radius, on-axis thickness, inflexion point position, and arrest point position are all in units of mm.

TTL: the total optical length from the object side surface of the first lens to the image surface of the camera optical lens along the optical axis, the unit of TTL is mm.

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|  | R | d |  | nd |  | vd |
|---|---|---|---|---|---|---|
| S1 | ∞ | d0 = | −0.313 |  |  |  |
| R1 | 1.748 | d1 = | 0.458 | nd1 | 1.5445 | v1 | 55.99 |
| R2 | 4.326 | d2 = | 0.067 |  |  |  |
| R3 | 2.914 | d3 = | 0.220 | nd2 | 1.6614 | v2 | 20.41 |
| R4 | 2.742 | d4 = | 0.329 |  |  |  |
| R5 | −6.434 | d5 = | 0.602 | nd3 | 1.5445 | v3 | 55.99 |
| R6 | −2.898 | d6 = | 0.060 |  |  |  |
| R7 | 10.624 | d7 = | 0.250 | nd4 | 1.6355 | v4 | 23.97 |

TABLE 1-continued

|  | R | d |  | nd |  | vd |
|---|---|---|---|---|---|---|
| R8 | 3.348 | d8 = | 0.337 |  |  |  |
| R9 | −11.706 | d9 = | 0.794 | nd5 | 1.5445 | v5 | 55.99 |
| R10 | −1.158 | d10 = | 0.384 |  |  |  |
| R11 | −34.022 | d11 = | 0.459 | nd6 | 1.5352 | v6 | 56.12 |
| R12 | 1.199 | d12 = | 0.555 |  |  |  |
| R13 | ∞ | d13 = | 0.210 | ndg | 1.5168 | vg | 64.17 |
| R14 | ∞ | d14 = | 0.186 |  |  |  | where, meanings of the various symbols will be described as follows.

S1: Aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of the lens and the distance on-axis between the lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;
d14: on-axis distance from the image side surface of the optical filter GF to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows the aspherical surface data of the camera optical lens 10 in the embodiment 1 of the present invention.

TABLE 3

| | Number of inflexion points | Inflexion point position 1 | Inflexion point position 2 |
|---|---|---|---|
| P1R1 | 0 | | |
| P1R2 | 0 | | |
| P2R1 | 1 | 0.515 | |
| P2R2 | 0 | | |
| P3R1 | 1 | 0.875 | |
| P3R2 | 1 | 1.035 | |
| P4R1 | 2 | 0.145 | 1.045 |
| P4R2 | 2 | 0.305 | 1.205 |
| P5R1 | 1 | 1.345 | |
| P5R2 | 1 | 1.095 | |
| P6R1 | 1 | 1.435 | |
| P6R2 | 1 | 0.655 | |

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 6.7411E−01 | −7.4597E−03 | 3.0058E−02 | −3.9005E−02 | 2.5529E−02 | 0.0000E+00 | 0.0000E+00 | 0.0000E+00 |
| R2 | −3.2096E+00 | −5.1378E−02 | 1.3422E−04 | 7.5058E−02 | −8.3114E−02 | 3.4701E−02 | 0.0000E+00 | 0.0000E+00 |
| R3 | 4.0637E+00 | −1.4754E−01 | 4.0670E−02 | −1.4339E−01 | 2.4481E−01 | −1.2836E−01 | 6.3292E−03 | 0.0000E+00 |
| R4 | 1.3632E+00 | −5.3118E−02 | −9.3816E−02 | 1.9573E−01 | −2.2588E−01 | 1.6313E−01 | 0.0000E+00 | 0.0000E+00 |
| R5 | −3.6549E+01 | −1.1677E−02 | −2.2779E−01 | 4.3352E−01 | −6.3371E−01 | 3.7227E−01 | 0.0000E+00 | 0.0000E+00 |
| R6 | −8.9038E−01 | −9.7540E−02 | 3.4190E−01 | −1.5421E−01 | 9.3304E−02 | 0.0000E+00 | 0.0000E+00 | 0.0000E+00 |
| R7 | −9.0000E+01 | −3.8805E−01 | 3.7913E−01 | −5.2169E−01 | 2.7841E−01 | −2.8837E−02 | 0.0000E+00 | 0.0000E+00 |
| R8 | −2.9662E+01 | −2.5586E−01 | 2.8081E−01 | −3.2942E−01 | 2.2978E−01 | −9.5528E−02 | 1.9250E−02 | 0.0000E+00 |
| R9 | 4.1795E+01 | −6.2594E−02 | 1.1091E−02 | 4.1072E−02 | −4.2622E−02 | 1.6079E−02 | −2.0497E−03 | 0.0000E+00 |
| R10 | −5.0901E+00 | −2.0655E−01 | 2.1908E−01 | −2.0890E−01 | 1.3956E−01 | −5.0679E−02 | 9.2095E−03 | −6.6534E−04 |
| R11 | 9.0000E+01 | −1.4043E−01 | 5.6431E−02 | −1.4435E−02 | 3.6711E−03 | −7.0706E−04 | 7.5053E−05 | −3.2293E−06 |
| R12 | −5.2468E+00 | −7.5331E−02 | 3.2592E−02 | −1.0447E−02 | 2.1771E−03 | −2.7467E−04 | 1.8938E−05 | −5.4456E−07 |

Where, K is a conic index, A4, A6, A8, A10, A12, A14, A16 are aspheric surface indexes.

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and table 4 show design data of inflexion points and arrest points the camera optical lens 10 lens in Embodiment 1 of the present invention, wherein, P1R1 and P1R2 represent the object side surface and image side surface of the first lens L1, P2R1 and P2R2 represent the object side surface and image side surface of the second lens L2, P3R1 and P3R2 represent the object side surface and image side surface of the third lens L3, P4R1 and P4R2 represent the object side surface and image side surface of the fourth lens L4, P5R1 and P5R2 represent the object side surface and image side surface of the fifth lens L5, P6R1 and P6R2 represent the object side surface and image side surface of the sixth lens L6. The data in the column named "inflexion point position" are the vertical distances from the inflexion points arranged on each lens surface to the optical axis of the camera optical lens 10. The data in the column named "arrest point position" are the vertical distances from the arrest points arranged on each lens surface to the optical axis of the camera optical lens 10.

TABLE 4

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 0 | |
| P4R1 | 1 | 0.255 |
| P4R2 | 1 | 0.565 |
| P5R1 | 0 | |
| P5R2 | 0 | |
| P6R1 | 1 | 2.265 |
| P6R2 | 1 | 1.735 |

Figure 2:
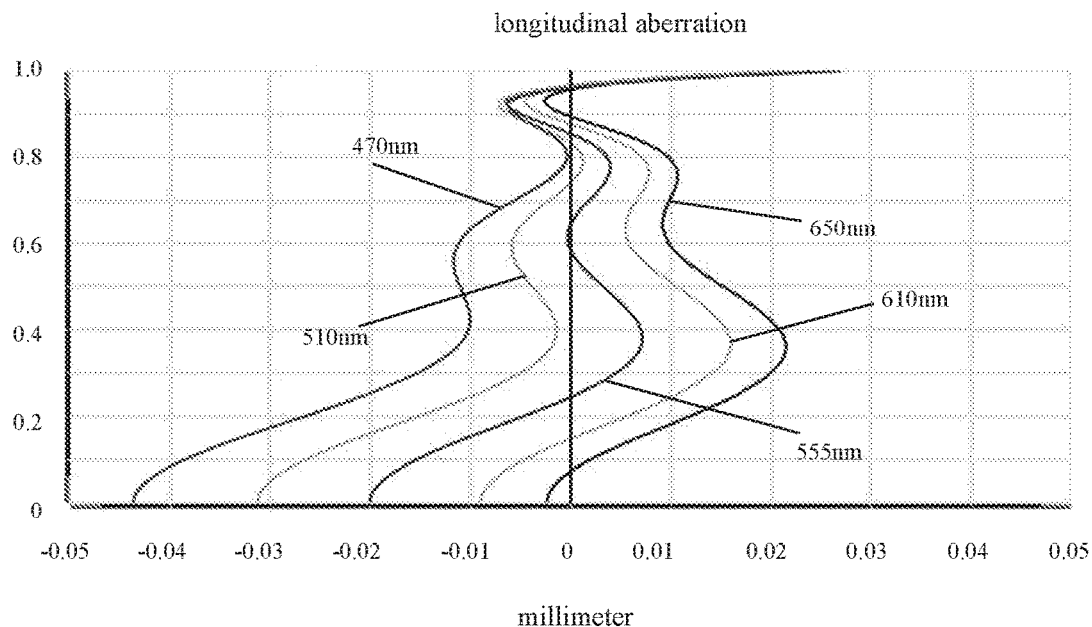
FIG. 2 is a schematic diagram of a longitudinal aberration of the camera optical lens shown in FIG. 1.
Figure 3:
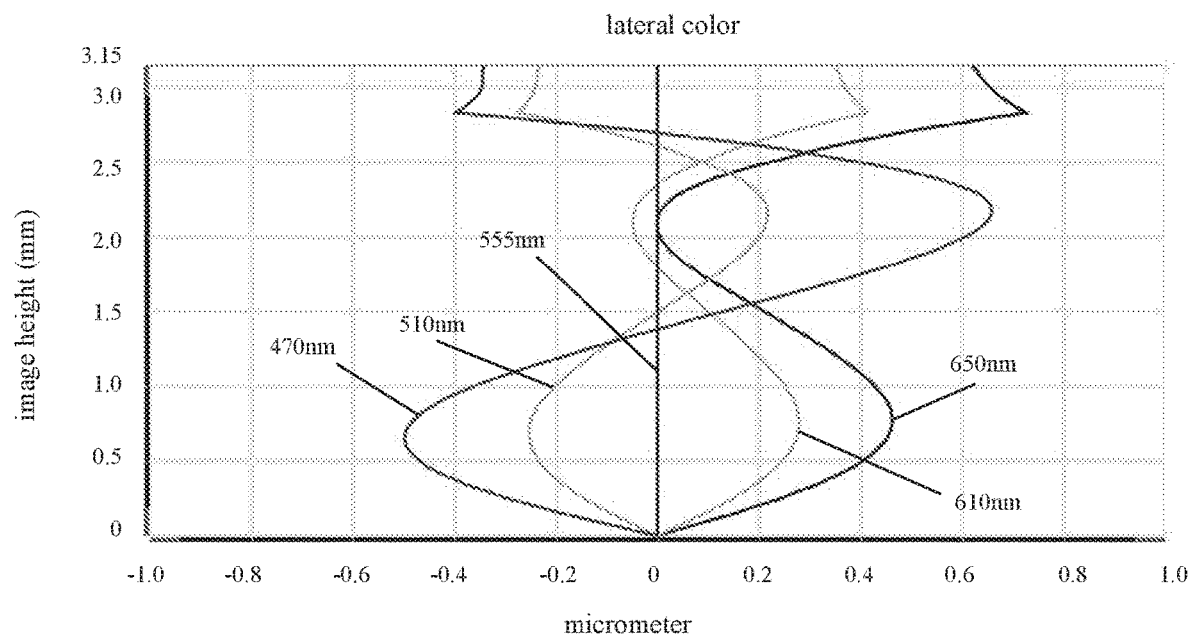
FIG. 3 is a schematic diagram of a lateral color of the camera optical lens shown in FIG. 1.
Figure 4:
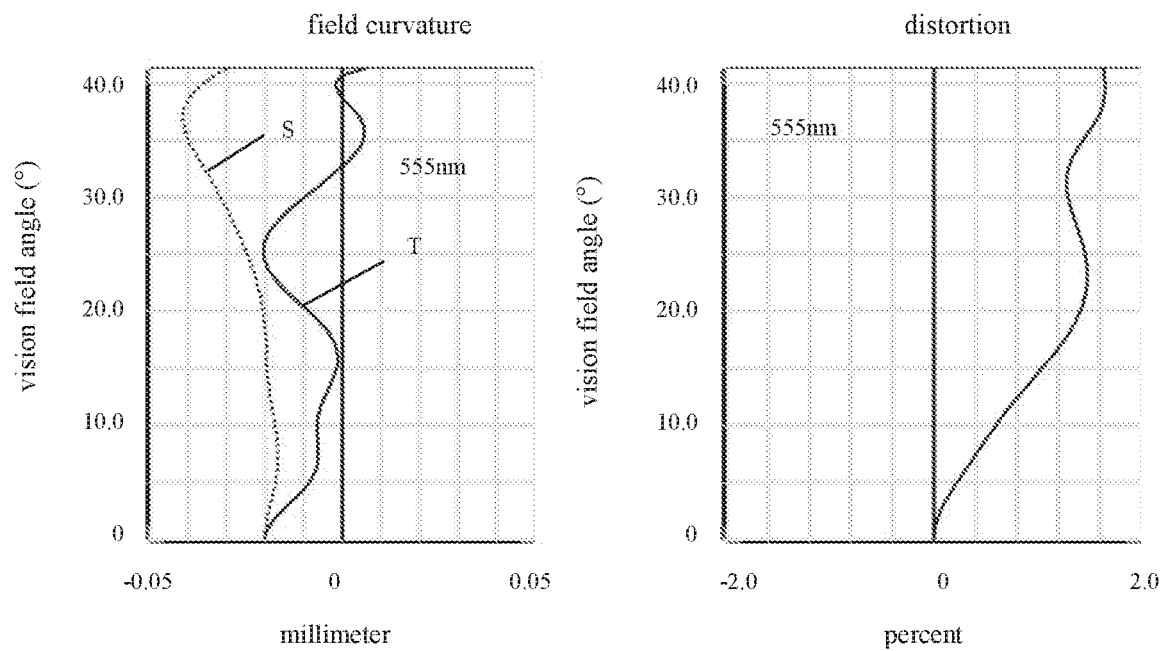
FIG. 4 is a schematic diagram of a field curvature and a distortion of the camera optical lens shown in FIG. 1.
Figure 5:
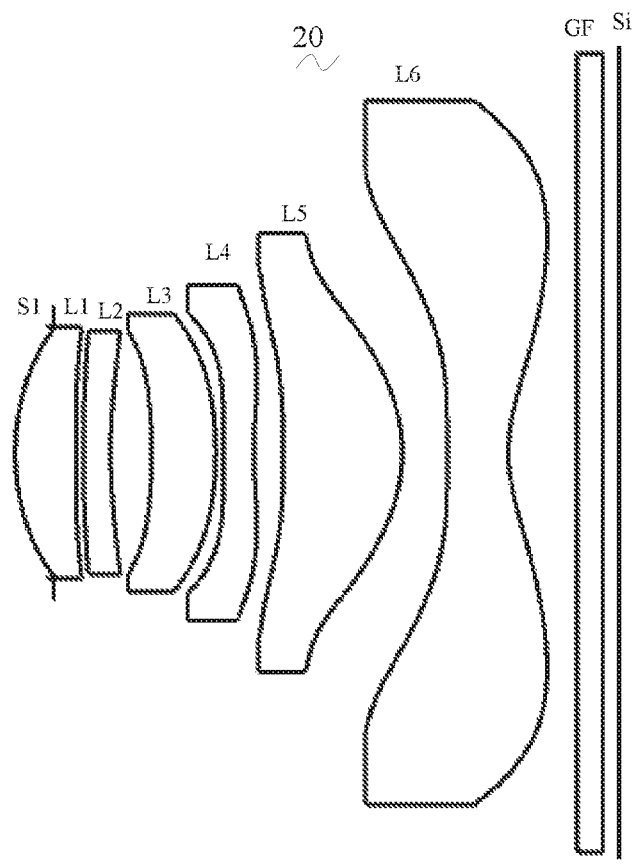
FIG. 5 is a schematic diagram of a structure of a camera optical lens in accordance with Embodiment 2 of the present disclosure.

FIG. 2 and FIG. 3 respectively illustrate a longitudinal aberration and a lateral color of light with wavelengths of 470 nm, 510 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 described below shows the various values of the Embodiments 1, 2, 3 and the values corresponding to the parameters which are specified in the conditions.

As shown in Table 13, Embodiment 1 satisfies the above conditions.

In this embodiment, an entrance pupil diameter of the camera optical lens is 1.944 mm. An image height of 1.0H is 3.147 mm. A FOV is 80.00°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1, the meaning of its symbols is the same as that of Embodiment 1, in the following, only the differences are listed.

Table 5 and table 6 show the design data of a camera optical lens 20 in Embodiment 2 of the present invention.

TABLE 5

| | R | | d | | nd | | vd |
|---|---|---|---|---|---|---|---|
| S1 | ∞ | d0 = | −0.310 | | | | |
| R1 | 1.725 | d1 = | 0.495 | nd1 | 1.5445 | v1 | 55.99 |
| R2 | −42.708 | d2 = | 0.060 | | | | |
| R3 | 40.410 | d3 = | 0.220 | nd2 | 1.6614 | v2 | 20.41 |
| R4 | 4.996 | d4 = | 0.334 | | | | |
| R5 | −4.220 | d5 = | 0.520 | nd3 | 1.5445 | v3 | 55.99 |
| R6 | −2.529 | d6 = | 0.060 | | | | |
| R7 | 11.990 | d7 = | 0.250 | nd4 | 1.6355 | v4 | 23.97 |
| R8 | 3.219 | d8 = | 0.240 | | | | |
| R9 | −7.985 | d9 = | 0.965 | nd5 | 1.5445 | v5 | 55.99 |
| R10 | −1.159 | d10 = | 0.363 | | | | |
| R11 | 32.803 | d11 = | 0.497 | nd6 | 1.5352 | v6 | 56.12 |
| R12 | 1.110 | d12 = | 0.555 | | | | |
| R13 | ∞ | d13 = | 0.210 | ndg | 1.5168 | vg | 64.17 |
| R14 | ∞ | d14 = | 0.133 | | | | |

Table 6 shows the aspherical surface data of each lens of the camera optical lens 20 in Embodiment 2 of the present invention.

TABLE 6

| | Conic coefficient | Aspherical Surface coefficients | | | | | | |
|---|---|---|---|---|---|---|---|---|
| | k | A4 | A6 | A8 | A10 | A12 | A14 | A16 |
| R1 | 1.2811E−01 | 6.8987E−04 | 3.9772E−02 | −3.4828E−02 | 2.2057E−02 | 0.0000E+00 | 0.0000E+00 | 0.0000E+00 |
| R2 | −1.0000E+01 | 1.7797E−01 | −3.3324E−01 | 4.9196E−01 | −4.5499E−01 | 1.8483E−01 | 0.0000E+00 | 0.0000E+00 |
| R3 | 9.0000E+01 | 1.8708E−01 | −4.3224E−01 | 5.7176E−01 | −4.9626E−01 | 2.1315E−01 | 0.0000E+00 | 0.0000E+00 |
| R4 | 1.1288E+01 | 5.9610E−02 | −3.0096E−01 | 5.0118E−01 | −5.5953E−01 | 2.9117E−01 | 0.0000E+00 | 0.0000E+00 |
| R5 | −1.7783E+00 | −8.9079E−03 | −2.3965E−01 | 3.3015E−01 | −4.0497E−01 | 2.1458E−01 | 0.0000E+00 | 0.0000E+00 |
| R6 | −2.8167E+00 | −7.3841E−02 | −2.8715E−02 | −2.2504E−02 | 2.6873E−02 | 0.0000E+00 | 0.0000E+00 | 0.0000E+00 |
| R7 | 9.0000E+01 | −3.6649E−01 | 3.0454E−01 | −3.3130E−01 | 1.6166E−01 | −2.4529E−02 | 0.0000E+00 | 0.0000E+00 |
| R8 | −5.9994E+00 | −3.1894E−01 | 2.7566E−01 | −1.8948E−01 | 7.5713E−02 | −1.4291E−02 | 1.5903E−03 | 0.0000E+00 |
| R9 | 1.6438E+01 | −4.9057E−02 | −1.0240E−01 | 2.0742E−01 | −1.4233E−01 | 4.8067E−02 | −6.7879E−03 | 0.0000E+00 |
| R10 | −5.5033E+00 | −2.3919E−01 | 2.2252E−01 | −1.6853E−01 | 8.3693E−02 | −1.8741E−02 | 9.6286E−04 | 1.2372E−04 |
| R11 | −9.0000E+01 | −2.3389E−01 | 1.5051E−01 | −6.0543E−02 | 1.4788E−02 | −1.9617E−03 | 1.1920E−04 | −1.9073E−06 |
| R12 | −5.8015E+00 | −8.0312E−02 | 3.5703E−02 | −1.0161E−02 | 1.6478E−03 | −1.5071E−04 | 6.3194E−06 | −4.3378E−08 |

Table 7 and table 8 show design data of the inflexion points and the arrest points of the camera optical lens 20 lens in Embodiment 2 of the present invention.

TABLE 7

| | Number of inflexion points | Inflexion point position 1 | Inflexion point position 2 |
|---|---|---|---|
| P1R1 | 0 | | |
| P1R2 | 1 | 0.115 | |
| P2R1 | 2 | 0.705 | 0.755 |
| P2R2 | 2 | 0.655 | 0.765 |
| P3R1 | 0 | | |
| P3R2 | 0 | | |
| P4R1 | 1 | 0.145 | |

TABLE 7-continued

| | Number of inflexion points | Inflexion point position 1 | Inflexion point position 2 |
|---|---|---|---|
| P4R2 | 2 | 0.305 | 1.175 |
| P5R1 | 2 | 0.985 | 1.325 |
| P5R2 | 2 | 1.125 | 1.615 |
| P6R1 | 2 | 0.115 | 1.595 |
| P6R2 | 2 | 0.615 | 2.705 |

TABLE 8

| | Number of arrest points | Arrest point position 1 |
|---|---|---|
| P1R1 | 0 | |
| P1R2 | 1 | 0.195 |
| P2R1 | 0 | |
| P2R2 | 0 | |
| P3R1 | 0 | |
| P3R2 | 0 | |
| P4R1 | 1 | 0.245 |
| P4R2 | 1 | 0.575 |
| P5R1 | 0 | |
| P5R2 | 0 | |
| P6R1 | 1 | 0.185 |
| P6R2 | 1 | 1.675 |

Figure 6:
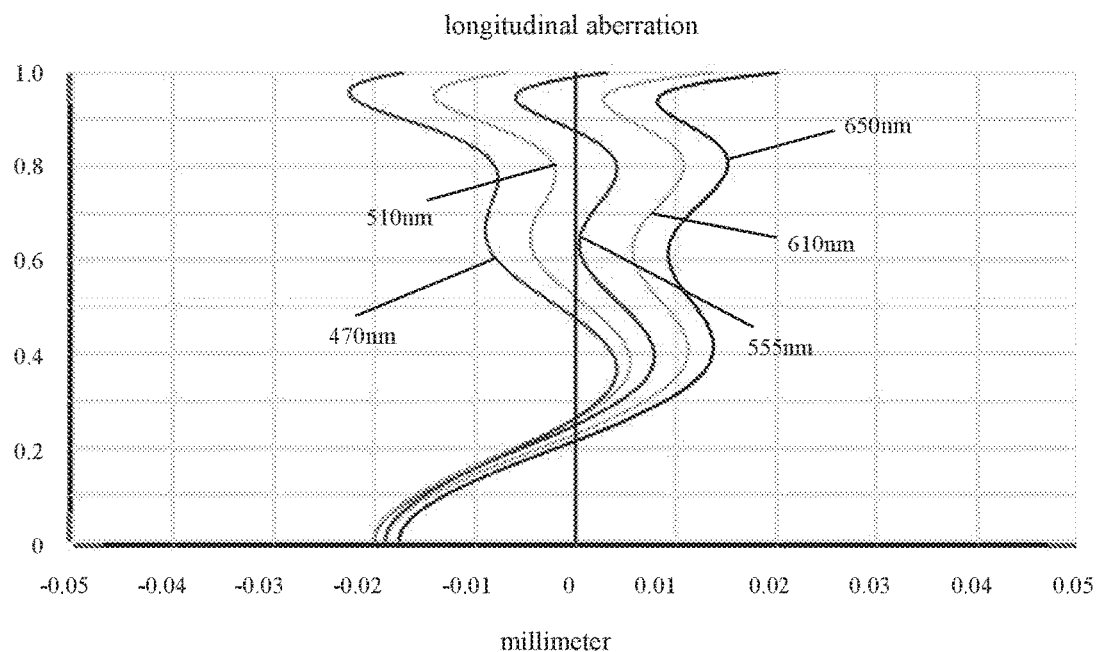
FIG. 6 is a schematic diagram of a longitudinal aberration of the camera optical lens shown in FIG. 5.
Figure 7:
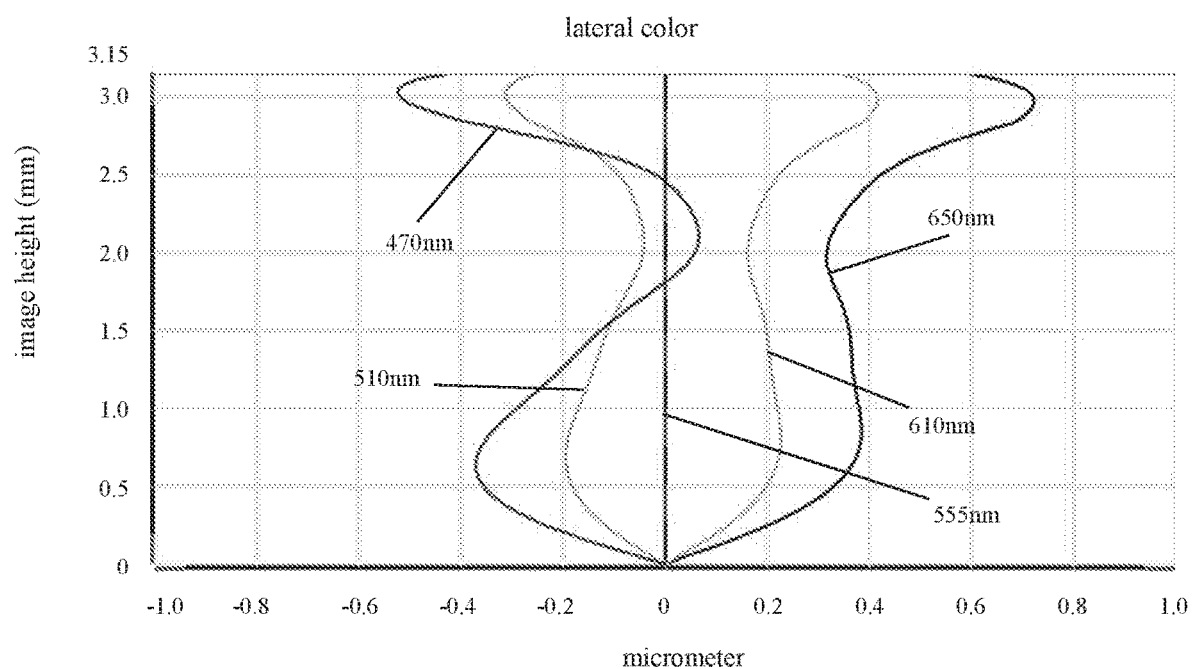
FIG. 7 is a schematic diagram of a lateral color of the camera optical lens shown in FIG. 5.
Figure 8:
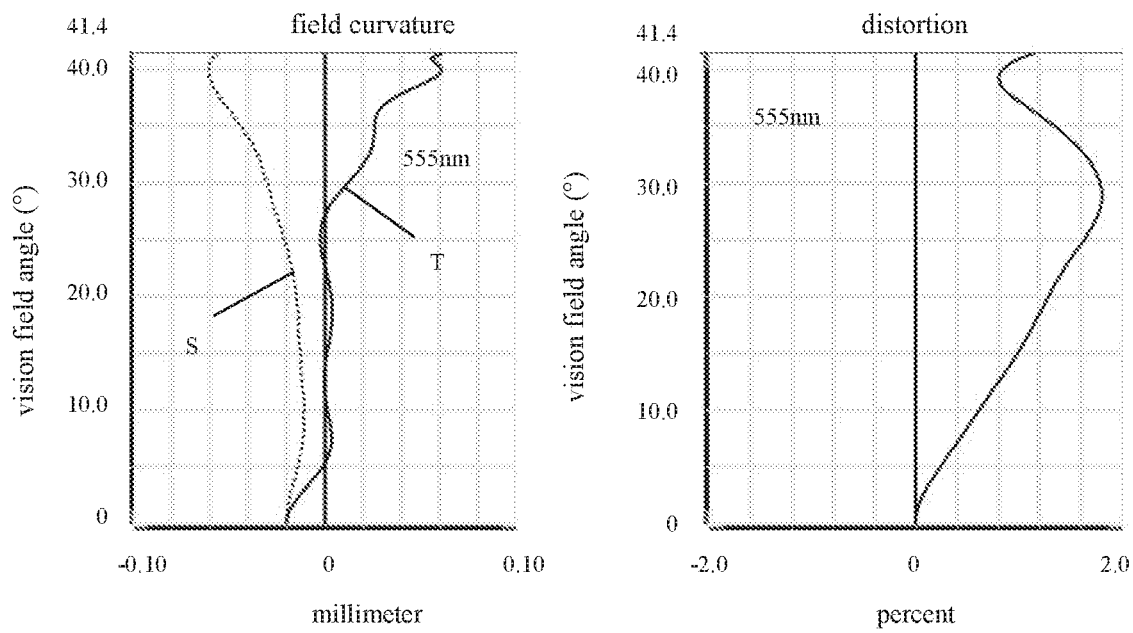
FIG. 8 is a schematic diagram of a field curvature and a distortion of the camera optical lens shown in FIG. 5.
Figure 9:
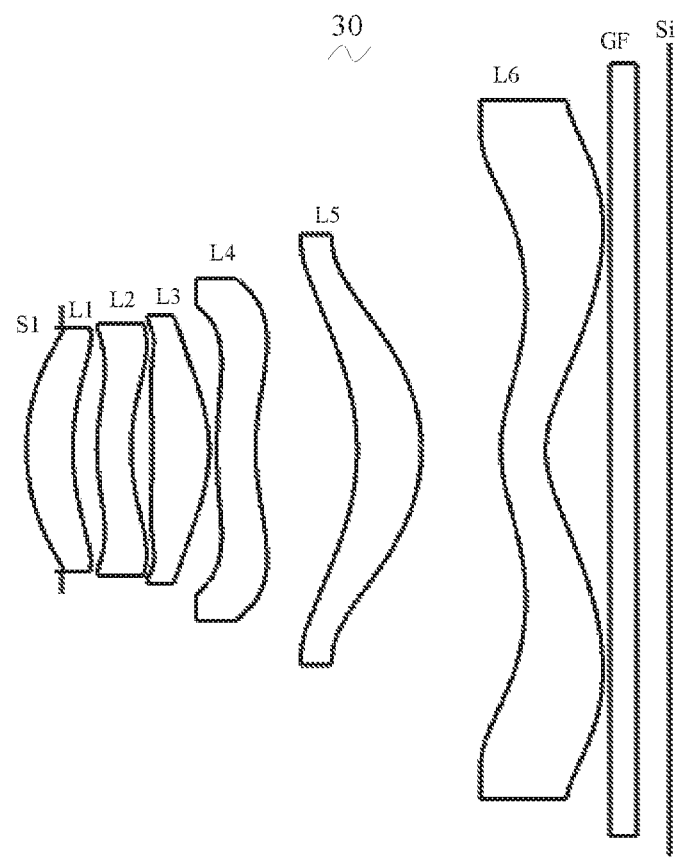
FIG. 9 is a schematic diagram of a structure of a camera optical lens in accordance with Embodiment 3 of the present disclosure.

FIG. 6 and FIG. 7 respectively illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and the distortion of light with a wavelength of 555 nm after passing the camera optical lens 20 according to Embodiment 2, in which a field curvature S is a field curvature in a sagittal direction and T is a field curvature in a tangential direction.

As shown in Table 13, Embodiment 2 satisfies the above conditions.

In this embodiment, the entrance pupil diameter of the camera optical lens is 1.944 mm. The image height of 1.0H is 3.147 mm. The FOV is 82.80°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1, the meaning of its symbols is the same as that of Embodiment 1, in the following, only the differences are listed.

The design information of a camera optical lens 30 in Embodiment 3 of the present invention is shown in the tables 9 and 10.

TABLE 9

|  | R |  | d |  | nd |  | vd |
|---|---|---|---|---|---|---|---|
| S1 | ∞ | d0 = | −0.275 |  |  |  |  |
| R1 | 1.587 | d1 = | 0.358 | nd1 | 1.5445 | v1 | 55.99 |
| R2 | 1.765 | d2 = | 0.189 |  |  |  |  |
| R3 | 1.750 | d3 = | 0.265 | nd2 | 1.6614 | v2 | 20.41 |
| R4 | 1.622 | d4 = | 0.165 |  |  |  |  |
| R5 | −4.258 | d5 = | 0.442 | nd3 | 1.5445 | v3 | 55.99 |
| R6 | −1.100 | d6 = | 0.060 |  |  |  |  |
| R7 | 4.049 | d7 = | 0.299 | nd4 | 1.6355 | v4 | 23.97 |
| R8 | 1.732 | d8 = | 0.790 |  |  |  |  |
| R9 | −1.895 | d9 = | 0.500 | nd5 | 1.5445 | v5 | 55.99 |
| R10 | −1.397 | d10 = | 0.617 |  |  |  |  |
| R11 | 1.024 | d11 = | 0.350 | nd6 | 1.5352 | v6 | 56.12 |
| R12 | 0.745 | d12 = | 0.500 |  |  |  |  |
| R13 | ∞ | d13 = | 0.210 | ndg | 1.5168 | vg | 64.17 |
| R14 | ∞ | d14 = | 0.254 |  |  |  |  |

Table 10 shows the aspherical surface data of each lens of the camera optical lens 30 in Embodiment 3 of the present invention.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 3.8979E−01 | −8.7610E−03 | −1.1459E−01 | 2.3310E−01 | 1.3255E−01 | −1.0259E+00 | 1.2258E+00 | −5.0924E−01 |
| R2 | −6.8712E+00 | −3.6637E−02 | 3.0099E−01 | −1.0926E+00 | 1.6860E+00 | −8.9207E−01 | −6.3893E−01 | 5.8230E−01 |
| R3 | −6.3819E+00 | −1.4273E−01 | −2.1744E−01 | −7.5067E−01 | 2.7268E+00 | −3.0669E+00 | 1.2322E+00 | 0.0000E+00 |
| R4 | −2.6598E+00 | −3.8803E−02 | −1.4919E−01 | −6.4228E−01 | 2.4260E+00 | −3.4214E+00 | 1.9864E+00 | −3.3961E−01 |
| R5 | −9.0000E+01 | 1.6390E−01 | −7.4996E−02 | 1.2408E+00 | −4.8670E+00 | 8.6023E+00 | −7.7707E+00 | 2.7360E+00 |
| R6 | −1.4799E+01 | −4.5402E−01 | 1.4925E+00 | −3.5349E+00 | 5.3740E+00 | −4.0934E+00 | 1.0243E+00 | 1.2938E−01 |
| R7 | 4.0050E+00 | 1.3896E−01 | −1.4011E+00 | 3.7126E+00 | −6.2252E+00 | 6.2176E+00 | −3.3893E+00 | 7.6741E−01 |
| R8 | −1.9645E+01 | 3.5178E−02 | −3.3503E−01 | 5.5248E−01 | −6.3104E−01 | 4.4004E−01 | −1.7179E−01 | 2.8345E−02 |
| R9 | 4.8065E−02 | 3.1065E−02 | −1.5274E−02 | 4.9949E−02 | −2.5599E−03 | −2.9527E−02 | 1.5881E−02 | −2.4283E−03 |
| R10 | −3.0406E+00 | −1.9573E−01 | 2.4051E−01 | −2.6320E−01 | 2.1178E−01 | −9.7218E−02 | 2.3126E−02 | −2.2216E−03 |
| R11 | −6.9587E+00 | −1.1912E−01 | 3.9811E−02 | −5.8373E−03 | −5.6778E−04 | 3.0111E−04 | −3.3188E−05 | 1.1352E−06 |
| R12 | −4.2734E+00 | −7.2243E−02 | 2.4386E−02 | −6.3547E−03 | 1.1369E−03 | −1.4277E−04 | 1.1228E−05 | −3.8133E−07 |

Table 11 and table 12 show design data of the inflexion points and the arrest points of the camera optical lens 30 lens in Embodiment 3 of the present invention.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 0.865 | | | |
| P1R2 | 1 | 0.645 | | | |
| P2R1 | 2 | 0.375 | 0.905 | | |
| P2R2 | 2 | 0.515 | 0.955 | | |
| P3R1 | 3 | 0.275 | 0.735 | 0.975 | |
| P3R2 | 3 | 0.665 | 0.845 | 0.975 | |
| P4R1 | 2 | 0.415 | 1.105 | | |
| P4R2 | 2 | 0.465 | 1.325 | | |
| P5R1 | 4 | 0.995 | 1.065 | 1.275 | 1.565 |
| P5R2 | 2 | 1.065 | 1.655 | | |
| P6R1 | 2 | 0.485 | 2.045 | | |
| P6R2 | 2 | 0.615 | 2.445 | | |

TABLE 12

| | Number of arrest points | Arrest point position 1 | Arrest point position 2 |
|---|---|---|---|
| P1R1 | 0 | | |
| P1R2 | 1 | 0.875 | |
| P2R1 | 1 | 0.635 | |
| P2R2 | 1 | 0.815 | |
| P3R1 | 2 | 0.475 | 0.835 |
| P3R2 | 0 | | |
| P4R1 | 1 | 0.665 | |
| P4R2 | 1 | 0.845 | |
| P5R1 | 0 | | |
| P5R2 | 0 | | |
| P6R1 | 1 | 1.165 | |
| P6R2 | 1 | 1.715 | |

Figure 10:
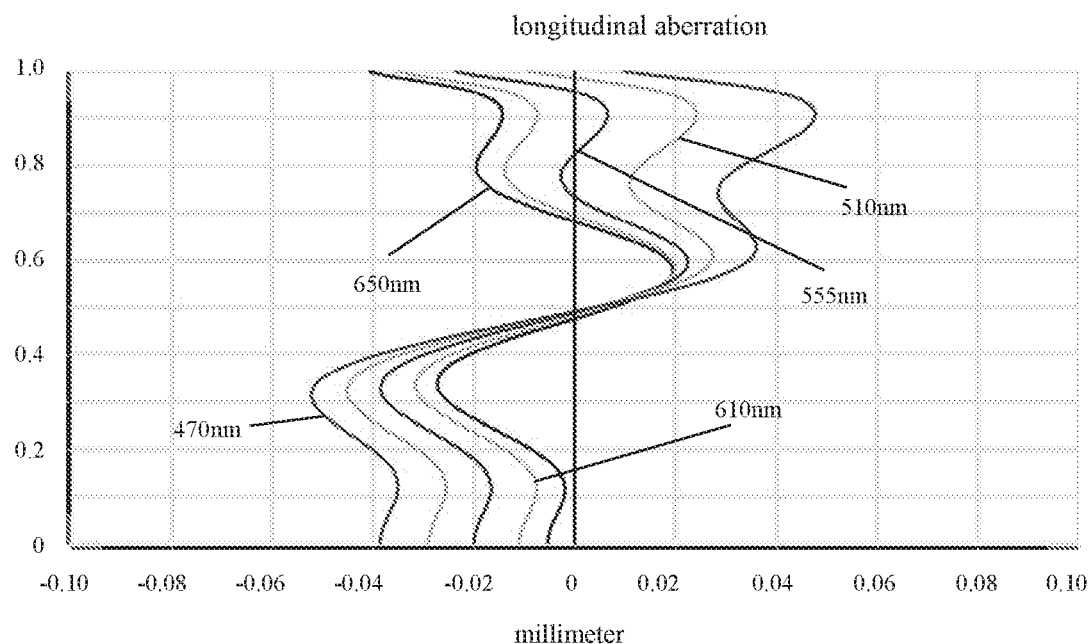
FIG. 10 is a schematic diagram of a longitudinal aberration of the camera optical lens shown in FIG. 9.
Figure 11:
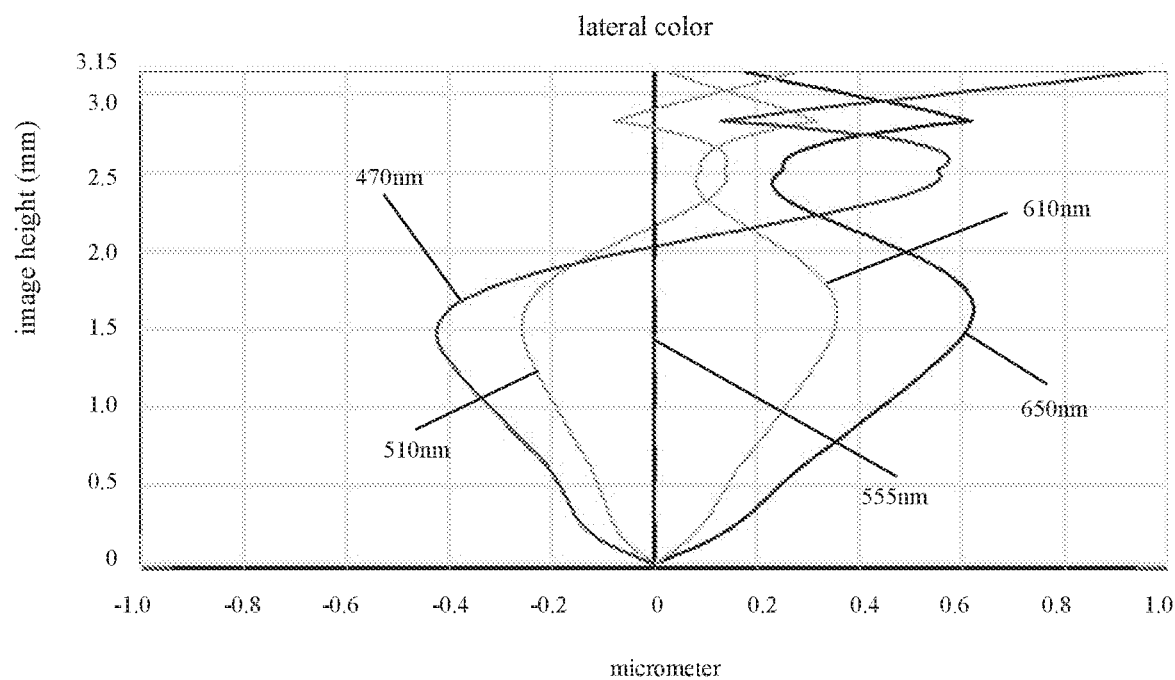
FIG. 11 is a schematic diagram of a lateral color of the camera optical lens shown in FIG. 9.
Figure 12:
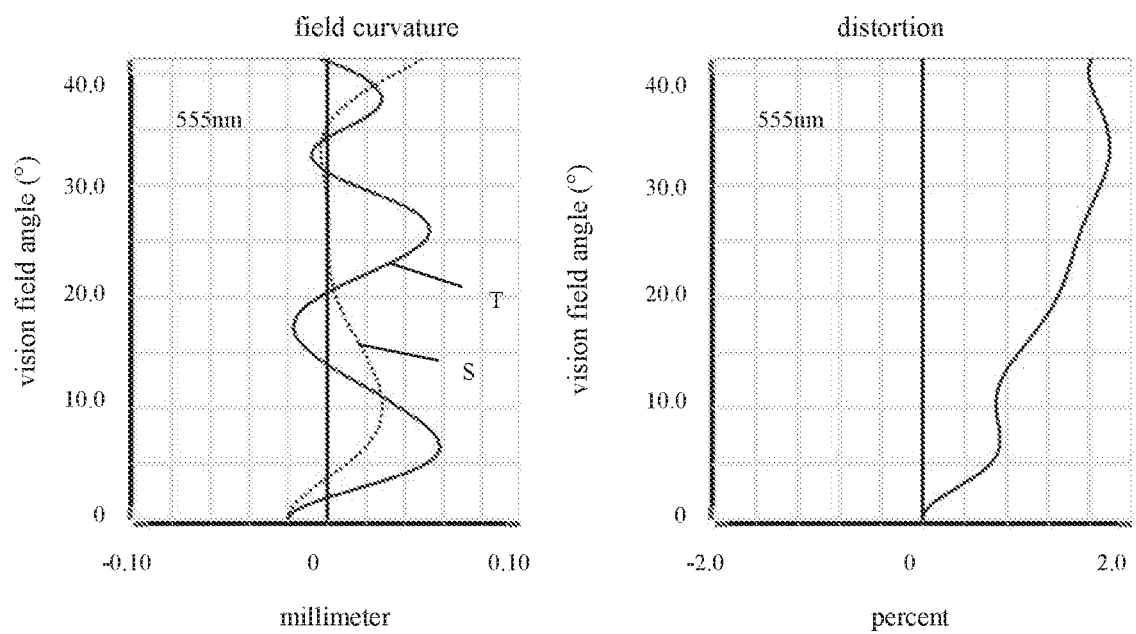
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 470 nm, 510 nm, 555 nm, 610 nm and 650 nm after passing the camera optical lens 30 according to Embodiment 3. FIG. 8 illustrates a field curvature and a distortion of light with a wavelength of 555 nm after passing the camera optical lens 30 according to Embodiment 3, in which a field curvature S is a field curvature in a sagittal direction and T is a field curvature in a tangential direction.

The following table 13, in accordance with the above conditions, lists the values in this embodiment corresponding to each condition. Apparently, the camera optical lens of this embodiment satisfies the above conditions.

In this embodiment, the entrance pupil diameter of the camera optical lens is 1.901 mm. The image height of 1.0H is 3.147 mm. The FOV is 80.00°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 3.500 | 3.499 | 3.499 |
| f1 | 5.053 | 3.046 | 16.864 |
| f2 | −141.379 | −8.564 | −192.316 |
| f3 | 9.103 | 10.422 | 2.588 |
| f4 | −7.737 | −6.951 | −4.979 |
| f5 | 2.291 | 2.363 | 7.196 |
| f6 | −2.148 | −2.152 | −9.061 |
| f12 | 5.052 | 4.321 | 17.108 |
| FNO | 1.80 | 1.80 | 1.84 |
| f1/f | 1.44 | 0.87 | 4.82 |
| R5/d5 | −10.69 | −8.12 | −9.63 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, from an object side to an image side in sequence: a first lens, a second lens, a third lens, a fourth lens, a fifth lens, and a sixth lens; the first lens has a positive refractive power, the second lens has a negative refractive power, and the third lens has a positive refractive power; the fourth lens has a negative refractive power, the fifth lens has a positive refractive power, the sixth lens has a negative refractive power, wherein the camera optical lens satisfies the following conditions:

$0.80 \leq f1/f \leq 5.00$;

$-4.42 \leq f4/f \leq -0.95$; and $-11.00 \leq R5/d5 \leq -8.00$;

where,
f: a focal length of the camera optical lens;
f1: a focal length of the first lens;
f4: a focal length of the fourth lens;
R5: a curvature radius of an object side surface of the third lens; and
d5: an on-axis thickness of the third lens.

2. The camera optical lens according to claim 1 further satisfying the following conditions:

$0.84 \leq f1/f \leq 4.91$; and $-10.84 \leq R5/d5 \leq 8.06$.

3. The camera optical lens according to claim 1, wherein, the first lens has a convex object side surface in a paraxial region; the camera optical lens further satisfies the following conditions:

$-37.66 \leq (R1+R2)/(R1-R2) \leq -0.61$; and $0.04 \leq d1/TTL \leq 0.15$;

where,
R1: a curvature radius of the object side surface of the first lens;
R2: a curvature radius of an image side surface of the first lens;
d1: an on-axis thickness of the first lens; and
TTL: a total optical length from the object side surface of the first lens of the camera optical lens to an image surface of the camera optical lens along an optical axis.

4. The camera optical lens according to claim 3 further satisfying the following conditions:

$-23.54 \leq (R1+R2)/(R1-R2) \leq -0.77$; and $0.06 d1 TTL \leq 0.12$.

5. The camera optical lens according to claim 1, wherein, the second lens has a convex object side surface in a paraxial region and a concave image side surface in the paraxial region;

the camera optical lens satisfies the following conditions:

$-109.93 \leq f2/f \leq -1.63$;

$0.64 \leq (R3+R4)/(R3-R4) \leq 49.33$; and $0.02 \leq d3/TTL \leq 0.08$;

where,
f2: a focal length of the second lens;
R3: a curvature radius of the object side surface of the second lens;
R4: a curvature radius of the image side surface of the second lens;
d3: an on-axis thickness of the second lens; and
TTL: a total optical length from an object side surface of the first lens of the camera optical lens to an image surface of the camera optical lens along an optical axis.

6. The camera optical lens according to claim 5 further satisfying the following conditions:

$-68.70 \leq f2/f \leq -2.04$;

$1.03 \leq (R3+R4)/(R3-R4) \leq 39.46$; and $0.04 \leq d3/TTL \leq 0.06$.

7. The camera optical lens according to claim 1, wherein, the object side surface of the third lens being concave in a paraxial region and an image side surface of the third lens being convex in the paraxial region; and the camera optical lens satisfies the following conditions:

$0.37 \leq f3/f \leq 4.47$;

$0.85 \leq (R5+R6)/(R5-R6) \leq 5.99$; and $0.04 \leq d5/TTL \leq 0.18$;

where,
f3: a focal length of the third lens;
R6: a curvature radius of the image side surface of the third lens; and TTL: a total optical length from an object side surface of the first lens of the camera optical lens to an image surface of the camera optical lens along an optical axis.

8. The camera optical lens according to claim 7 further satisfying the following conditions:

$$0.59 \leq f3/f \leq 3.57;$$

$$1.36 \leq (R5+R6)/(R5-R6) \leq 4.79;  \text{and}$$

$$0.07 \leq d5/TTL \leq 0.15.$$

9. The camera optical lens according to claim 1, wherein, the fourth lens has a convex object side surface in a paraxial region and a concave image side surface in the paraxial region; the camera optical lens further satisfies the following conditions:

$$0.87 \leq (R7+R8)/(R7-R8) \leq 3.74; \text{ and}$$

$$0.03 \leq d7/TTL \leq 0.09;$$

where,
R7: a curvature radius of the object side surface of the fourth lens;
R8: a curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

10. The camera optical lens according to claim 9 further satisfying the following conditions:

$$-2.76 \leq f4/f \leq -1.19;$$

$$1.39 \leq (R7+R8)/(R7-R8) \leq 2.99; \text{ and}$$

$$0.04 \leq d7/TTL \leq 0.07.$$

11. The camera optical lens according to claim 1, wherein, the fifth lens has a concave object side surface in a paraxial region and a convex image side surface in the paraxial region; the camera optical lens further satisfies the following conditions:

$$0.33 \leq f5/f \leq 3.08;$$

$$0.61 \leq (R9+R10)/(R9-R10) \leq 9.92; \text{ and}$$

$$0.05 \leq d9/TTL \leq 0.30;$$

where,
f5: a focal length of the fifth lens;
R9: a curvature radius of the object side surface of the fifth lens;
R10: a curvature radius of the image side surface of the fifth lens;
d9: an on-axis thickness of the fifth lens; and
TTL: a total optical length from an object side surface of the first lens of the camera optical lens to an image surface of the camera optical lens along an optical axis.

12. The camera optical lens according to claim 11 further satisfying the following conditions:

$$0.52 \leq f5/fb \leq 2.47;$$

$$0.98 \leq (R9+R10)/(R9 \leq R10) \leq 7.93; \text{ and}$$

$$0.08 \leq d9/TTL \leq 0.24.$$

13. The camera optical lens according to claim 1, wherein, the sixth lens has a concave image side surface in a paraxial region; the camera optical lens further satisfies the following conditions:

$$-5.18 \leq f6/f \leq -0.41;$$

$$0.47 \leq (R11+R12)/(R11-R12) \leq 9.51; \text{ and}$$

$$0.04 \leq d11/TTL \leq 0.15;$$

where,
f6: a focal length of the sixth lens;
R11: a curvature radius of an object side surface of the sixth lens;
R12: a curvature radius of the image side surface of the sixth lens;
d11: an on-axis thickness of the sixth lens; and
TTL: a total optical length from an object side surface of the first lens of the camera optical lens to an image surface of the camera optical lens along an optical axis.

14. The camera optical lens according to claim 13 further satisfying the following conditions:

$$-3.24 \leq f6/f \leq -0.51;$$

$$0.75 \leq (R11+R12)/(R11-R12) \leq 7.61; \text{ and}$$

$$0.06 \leq d11/TTL \leq 0.12.$$

15. The camera optical lens according to claim 1, wherein, a combined focal length of the first lens and the second lens is f12; the camera optical lens further satisfies the following conditions:

$$0.62 \leq f12/f \leq 7.33.$$

16. The camera optical lens according to claim 15 further satisfying the following conditions:

$$0.99 \leq f12/f \leq 5.87.$$

17. The camera optical lens as described in claim 1, wherein a total optical length TTL from an object side surface of the first lens of the camera optical lens to an image surface of the camera optical lens along an optical axis is less than or equal to 5.50 millimeters.

18. The camera optical lens as described in claim 17, wherein the total optical length TTL from the object side surface of the first lens of the camera optical lens to the image surface of the camera optical lens along the optical axis is less than or equal to 5.25 millimeters.

19. The camera optical lens as described in claim 1, wherein an F number of the camera optical lens is less than or equal to 1.90.

20. The camera optical lens as described in claim 19, wherein the F number of the camera optical lens is less than or equal to 1.86.

* * * * *